United States Patent [19]

Davidson et al.

[11] Patent Number: 5,376,442
[45] Date of Patent: Dec. 27, 1994

[54] COMPOSITE MEMBRANES

[75] Inventors: Alexander P. Davidson, Shipston-on-Stour; Michael P. Thomas, Banbury; Steven W. Summers, Leamington Spa, all of England

[73] Assignee: North West Water Group PLC, Warrington, United Kingdom

[21] Appl. No.: 37,712

[22] Filed: Mar. 24, 1993

Related U.S. Application Data

[63] Continuation of Ser. No. 884,214, May 11, 1992, abandoned, which is a continuation of Ser. No. 355,646, May 22, 1989, abandoned.

[30] Foreign Application Priority Data

May 24, 1988 [GB] United Kingdom ............. 8812217
Feb. 7, 1989 [GB] United Kingdom ............. 8902649

[51] Int. Cl.$^5$ ................. B01D 39/08; B01D 39/20; B32B 5/18
[52] U.S. Cl. ................. 428/307.7; 210/490; 210/500.25; 210/500.26; 210/504; 210/509; 264/60; 428/311.5; 428/312.8
[58] Field of Search .............. 428/307.3, 307.7, 311.5, 428/312.8, 247, 255, 256, 283, 285, 469, 471, 472; 264/60; 210/490, 500.25, 500.26, 503, 504, 509

[56] References Cited

U.S. PATENT DOCUMENTS

| | | | |
|---|---|---|---|
| 2,980,532 | 4/1961 | Martensson et al. | 75/205 |
| 3,022,187 | 2/1962 | Eyraud et al. | 428/312.2 |
| 4,356,215 | 10/1982 | Auriol et al. | . |
| 4,613,369 | 9/1986 | Koehler | 75/246 |
| 4,680,221 | 7/1987 | Murayama et al. | 428/246 |
| 4,692,354 | 9/1987 | Asaeda et al. | . |
| 4,711,719 | 12/1987 | Leenaars et al. | 210/500.26 |
| 4,722,771 | 2/1988 | Textor et al. | . |
| 4,738,874 | 4/1988 | Berardo et al. | 427/244 |
| 4,761,323 | 8/1988 | Mühlratzer et al. | . |
| 4,762,619 | 8/1988 | Gaddis et al. | 210/639 |
| 4,837,055 | 6/1989 | Bitter | 427/244 |
| 4,888,033 | 12/1989 | Charpin et al. | 428/312.8 |
| 4,888,114 | 12/1989 | Gaddis et al. | 210/500.25 |
| 4,935,139 | 6/1990 | Davidson et al. | 210/490 |
| 4,944,996 | 7/1990 | Bauer et al. | 428/307.7 |
| 4,981,590 | 1/1991 | Van 'T Veen et al. | 210/490 |

FOREIGN PATENT DOCUMENTS

| | | |
|---|---|---|
| 1239011 | 7/1988 | Canada . |
| 0040282 | 5/1980 | European Pat. Off. . |
| 0219383 | 9/1986 | European Pat. Off. . |
| 0223022 | 10/1986 | European Pat. Off. . |
| 0224444 | 6/1987 | European Pat. Off. . |
| 0242208 | 10/1987 | European Pat. Off. . |
| 2463636 | 2/1981 | France . |
| 2502508 | 10/1982 | France . |
| 3515025A1 | 10/1986 | Germany . |
| 79631 | 12/1979 | Luxembourg . |
| 1173179 | 12/1969 | United Kingdom . |

*Primary Examiner*—James C. Cannon
*Attorney, Agent, or Firm*—Cooper & Dunham

[57] ABSTRACT

A composite membrane comprises an inorganic support having interstices and porous inorganic films of sintered non-metallic particles carried by the support and bridging the interstices thereof. The support is preferably a woven metal mesh, with the films substantially coplanar with the support. The films may be formed by applying a suspension of refractory particles in a polymer solution to bridge the interstices of the support, and heating the films to partly sinter the particles. Since the films are in compression at ambient temperature, any cracks that may be formed by damage to the composite membrane tend not to propagate.

10 Claims, No Drawings

COMPOSITE MEMBRANES

This is a continuation of application Ser. No. 884,214, filed May 11, 1992, now abandoned, which is a continuation of Ser. No. 355,646, filed May 22, 1989, now abandoned.

EPA 242208 describes composite membranes comprising a porous inorganic support and a microporous inorganic film overlying a surface of the support. The supports there envisaged are of alumina, particularly sheets of anodic aluminium oxide. Such composite membranes have advantages of chemical inertness, a rather uniform pore size, substantial freedom from cracks or pinholes, and high flux, and have been commercially successful. But they do suffer from a few disadvantages: they are somewhat expensive and fragile; they are not plastically deformable, and cannot easily be shaped; if cracks do form, they tend to propagate; and they are difficult to attach e.g. to filter supports. It is an object of this invention to provide composite membranes which reduce or overcome these disadvantages.

The present invention provides a composite membrane comprising an inorganic support having interstices and porous inorganic films of sintered non-metallic particles carried by the support and bridging the interstices thereof. Preferably the membrane is plastically deformable without substantially altering the porosity or permeability of the films. Preferably the films are substantially co-planar with the support.

The inorganic supports are porous by virtue of having interstices. A pore is characterised by having a length which is large in comparison to its diameter, and the latter is no larger than 4 $\mu$m. By contrast, the interstices of the support are characterized by having a diameter greater than 5 $\mu$m, preferably greater than 10 $\mu$m, and the length of the interstice is preferably less than 10 times the diameter. The term diameter is here used to refer to the average cross sectional dimension of the aperture, or to the minimum cross sectional dimension when the aperture is far from circular.

The support is preferably of woven or non-woven fibres, the term fibre being used to include filaments and wires which may be continuous or discontinuous. Although glass and other refractories can be used, the support is preferably of metal, particularly in the form of a woven metal mesh. Suitable woven mesh supports may comprise one or more layers of meshes and which may have a different interstice sizes. The nature of the metal is not very critical, and one suitable metal is stainless steel.

The interstices of the support generally have an average diameter in the range 5 $\mu$m to 5 mm, preferably 10 $\mu$m to 1 mm. A preferred support is a 100 mesh woven stainless steel mesh which has interstices of 135 $\mu$m diameter. The utility of 70 mesh and even 20 mesh woven metal sheets has been demonstrated.

It is surprising that such coarsely porous supports can provide composite membranes having useful properties. The conventional wisdom has been that very thin porous films must be supported on very finely porous supports, so as to ensure that the film bridges the pores of the support. This invention demonstrates that, under suitable conditions, relatively coarsely porous supports can be used. An advantage of such composite membranes is that the film is generally coplanar with the porous support, so that bending the membrane does not necessarily involve stretching the film. It may be preferable to flatten the weave, e.g. by rolling or hammering the mesh or sheet, so as to ensure that the film bridging each pore is more nearly coplanar with the sheet.

Alternatively, the support may be an expanded metal mesh. Advantages of this structure are that the mesh extends perpendicular to the plane of the support which helps to create turbulence in a fluid being filtered and so avoid blockage; and that the porous films bridging the pores or cells of the mesh may themselves be at an angle to the plane of the support.

Alternatively, the support may be a metal foil having holes bridged by the porous inorganic films. Holes can be punched in metal foil, e.g. in a regular array, or leaving hole-free regions, along which the foil can be bent or folded to give a filter having a high specific surface area. When the foil is dipped in or coated with a sol or suspension, the resulting film may bridge the holes and overlie the remainder of the foil surface. Any cracking of the film, that may occur when the foil is bent, in regions overlying the foil will not damage the properties of the membrane as a filter.

These interstices are bridged by porous films of inorganic material carried by the support. Porous films include those suitable for separation and filtration processes including the ultra-filtration and micro-filtration ranges. Ultra-filtration is generally accepted to be defined by retention of molecules or particles of the size range 20 nm down to 1 nm (1 nm = 1 nanometer = $10^{-9}$ m). An alternative way of expressing this filtration range is by converting molecular size to molecular weight: on this basis it is the retention of species in the molecular weight range of 300,000 to 300. Micro-filtration is generally accepted to cover the size range of 20 nm up to 200 nm (i.e. 0.02 to 2 $\mu$m). Although there is no critical upper limit, the porous films preferably have an average pore diameter not more than 2% of the average diameter of the fibres of the support.

After sintering, the pore size of the porous film is related to the particle size. Large particles, above about 1 $\mu$m in diameter, result in a pore size of approximately 10% of the particle diameter. Sub-micron particles may tend to give a pore size which is about 50% of the particle diameter.

The films may be of sintered non-metallic particles, for example titania, alumina, ceria, zirconia, lead zirconate titanate (PZT), silica, mullite, refractory metal oxides generally, and mixtures thereof. Such films can be formed by techniques generally known, by applying a suspension of the particles or precursors thereof to the support, dewatering the suspension (or otherwise removing the suspending medium), and heating the resulting layer to a temperature to partially sinter the particles. Where the particles are of sub-micron size, this technique may involve applying a sol to the support, converting the sol to a gel and heating the gel. It is necessary that the contact area between the particles and the surfaces of the support be sufficiently great for the two to adhere together so that the films are bound to the support. This requirement places an upper limit on the permissible size of the particles. For example, where the support is composed of fibres, the particles of the films should have an average diameter not more than 20%, preferably not more than 10%, of the average diameter of the fibres.

When the films are formed from a suspension, that suspension may comprise 60-95%, preferably 75-90%, by weight of relatively larger particles, the balance being of much smaller particles. The larger particles may have an average size in the range 0.05–50 microns, particularly 1–10 microns, chosen to generate films with pores of desired size. The smaller particles may have an average size in the range 4 nm up to 1 micron, but not more than 0.1 times the size of the larger particles. The smaller particles act as a sintering aid, permitting the film to be sintered at lower temperatures than would other-wise be possible. They also improve adhesion between the films and the support. The proportions of the smaller particles should not be so great as to substantially block the pores between the larger particles.

One embodiment of the invention involves using a colloidal sol of an inorganic material (such as a ceramic oxide) or a solution of a polymeric precursor to an inorganic material (such as a ceramic oxide) to the support. The colloidal sol may be derived by known means from an inorganic oxide powder, such as an oxide of the elements mentioned above. More preferably the colloidal sol or polymeric solution is derived by hydrolysis of a metal alkoxide. For example, boehmite sols may be prepared using the procedure described in U.S. Pat. No. 3,944,658. According to this procedure, an aluminium alkoxide is hydrolysed in an excess of water maintained at 80° C., and subsequently peptized with an acid, to form a clear transparent sol. The sol consists of colloidal particles of stable crystalline aluminium monohydrate, AlO(OH), dispersed in the aqueous phase. The sol so produced typically contains about 30 gl$^{-1}$ of aluminium values expressed as $Al_2O_3$, and can be adjusted to the desired concentration for coating by dilution with water or evaporation. Coatings may be achieved with sols of concentration up to 190 gl$^{-1}$, preferably 10 gl$^{-1}$ to 90 gl$^{-1}$, of aluminium values expressed as $Al_2O_3$. The sols may be hydrothermally treated to increase particle size and hence viscosity. A typical treatment would be to heat for 3 hours at 200° C. in an autoclave. As an alternative example, —Ti—O—Ti— polymer solutions may be prepared using a procedure similar to that described in the article by C. J. Brinker and M. S. Harrington in Solar Energy Materials, 1981, volume 5, 159–172, wherein a titanium alkoxide is partially hydrolysed in an alcoholic solution at room temperature in the presence of an acid catalyst to form a stable —Ti—O—Ti— polymer solution. The solution so produced typically contains about 10 to 30 gl$^{-1}$ of titanium values expressed as $TiO_2$, and can be adjusted to the desired concentration for coating by evaporation of solvent or further dilution with alcohol. The sol or solution can be applied to the support in the freshly concentrated state, or aged to increase its viscosity prior to application.

Control over the film thickness in the composite membrane can be achieved in part by control over the concentration and vicosity of the suspension or sol prior to application to the support. The films in each interstice need to be self supporting, and may preferably have a minimum thickness of at least 0.01 and preferably at least 0.2 μm. Generally, a single film is formed, with portions overlying the surface of the support and portions bridging the interstice. Since the portion of the film bridging one interstice is generally quite independent of the portions bridging neighbouring interstices, each portion has been regarded for the purposes of this specification as a separate film. These films (bridging the interstices of the support) are generally co-planar with the support, so that they are not subjected to tension throughout the thickness. This reduces the tendency for cracks to grow through the thickness. Generally a miniscus effect is observed, by which each film has a minimum thickness in the middle of the interstice, which thickness is generally about the same as or less than the thickness of the support. Where the minimum film thickness across the interstice is more than about twice the thickness of the support, the films can no longer be said to be carried by the support.

It is preferred that the support has a co-efficient of linear expansion at least as great as, and desirably greater than, that of the inorganic films. This feature has the following consequence. The composite membrane first comes into existence at an elevated temperature at which it is heated to convert a gel to a film or to sinter particles into a film. On subsequent cooling, the support shrinks faster than the films, with the result that the films are under compression. As a result, any cracks that do develop in the films bridging the interstices due to damage or deformation, tend to close rather than to propagate.

The composite membranes of this invention can preferably be plastically deformed without substantially altering the porosity or permeability of the films. Where the film is a composite membrane comprising several layers of different pore size, the fine pore layers must be on the inside of the bend, i.e. under compression. When the support is a fibrous mesh, this test should be performed by flexing the support about an axis parallel to one set of fibres. Because the films are preferably generally co-planar with the support, such flexing does not significantly stretch or compress the films. Because the films are generally in a state of compression, any cracks that may develop tend to close rather than to propagate. Film-forming material overlying the (fibres of the) support may stretch and crack when the support is flexed, but such stretching or cracking should not have any major effect on the porosity or permeability of the films bridging the interstices.

In order to assist bridging of the interstices of the support, it may be desirable to increase the viscosity of the sol or suspension. This can be done simply by adding a relatively viscous miscible organic liquid. Alternatively, a relatively viscous relatively high boiling point liquid, for example a polymer such as polyvinyl alcohol or a polyol such as ethylene glycol or glycerol, may be added and thereafter heated to remove some or all of the less viscous liquid but without breaking down the colloidal dispersion or solution of inorganic material.

Addition to the sol or suspension of a binder may be helpful. Various materials can be used for this purpose, including polyvinyl alcohol and methyl cellulose. In addition to thickening the sol or suspension, a material of this kind may act as a film-forming binder, or may, particularly in the case of methyl cellulose, act as a wetting agent. Suitable concentrations are readily determined by experiment, and are likely to be in the range of 10 to 50 gl$^{-1}$.

Addition of a surface active agent to the sol or suspension prior to application aids the formation of thin uniform films. Non-ionic surfactants such as Nonidet (Octylphenyl ethylene oxide condensate supplied by BDH Chemicals), or Methocel (methyl cellulose polymer supplied by Dow Chemical Company) added typically at the concentration level of 0.1 to 1 percent by weight, can result in thinner uniform films than are otherwise obtainable.

The films can be formed on the support by deposition of a concentrated sol or suspension followed by air drying. Various techniques including brush, spray, dip, electrophoretic and thermophoretic techniques may be used to apply the sol or suspension to the support. Spray coatings can be applied using an aerosol method.

With mesh supports, application of sol or suspension is preferably effected by dipping, brush coating, roller coating or spraying. It is often preferable to perform the dipping procedure two or more times, a film being formed by ambient temperature drying or heat treating between each dip. By this means, more reliably complete coverage of all interstices of the substrate may be achieved. In order to aid adhesion, the metal or other support may be pretreated by coating with a dilute sol or suspension of the same composition, which merely coats the fibres of a mesh without forming films over the interstices.

Where porous inorganic films have been formed bridging the interstices of the support, it may be advantageous to apply over one or both surfaces thereof a microporous inorganic film. Such microporous inorganic films preferably have an average thickness of less than 10.0 μm, most preferably from 0.05 to 5.0 μm and a substantially uniform pore size from 0.5 to 200 nm, preferably 0.5 to 30 nm, substantially free of cracks and pin holes, and may be formed by a sol gel technique as described in EPA 242208. Alternatively, a microporous layer having a pore size of greater than 0.1 μm, but less than the pore size of the inorganic film bridging the interstices of the support, may be applied to at least one face. Such films may be applied by dipping, spraying or filtration of a suspension of fine ceramic particles, preferably in an aqueous medium, and followed by sintering.

The freshly coated support is then heated to transform the layer into a permeable or porous refractory film. For example, heating converts a boehmite gel layer into a mechanically stable gamma-$Al_2O_3$ structure. Heating conditions are not critical to the invention and may be conventional, bearing in mind the need to avoid thermal shock which might result in the formation of cracks or pin-holes. A typical heating schedule for a boehmite gel layer might be:

(a) heating at 50° C. per hour to 200° C. followed by isothermal treatment at 200° C. for 15 minutes, (b) subsequent heating at 200° C. per hour to 450°–650° C. followed by an isothermal hold for 15 minutes, (c) cooling at 50° C. per hour to room temperature. The first part of the heating schedule up to 200° C. is designed to remove absorbed water; the second stage to 450°–650° C. removes bound water, burns off any binder and transforms the gamma-AlOOH to gamma-$Al_2O_3$. This transformation occurs at temperatures at or above 390° C. Finally, the individual isolated particles of alumina sinter together, eventually becoming fully dense if a high enough temperature is reached. At high temperatures, organic binders burn out and may leave voids which contribute to porosity. If these are not desired, it may be preferred to apply a final coating of a sol not containing any organic binder.

On cooling to room temperature, the metal support contracts more than the permeable or porous (e.g. refractory oxide) film. The physical dimensions of the film were defined at the sintering temperature and matched those of the support at that temperature. So long as the film is sufficiently well bonded so as not to spall off, the major stressing of the film is compressive, an ideal situation from the viewpoint of a ceramic structural component. Thus, when the micro-porous film is subjected to a high pressure difference in use, it will only be loaded in tension when the original compressive pre-loading, which can be predicted and controlled in advance, is backed off to a sufficient degree.

The following advantages should be noted for various embodiments of the invention:

a) The composite membranes are plastically deformable without substantial loss of filter performance, and are therefore less likely to suffer from handling abuse.

b) Although defects are inevitable in films formed of refractory oxides, these defects do not propagate, because the films are in compression rather than tension at ambient temperature.

c) Supports of metal or glass fibre mesh are cheap compared to ceramic supports.

d) Metal supports are easily fixed, e.g. by welding, crimping or brazing, to a rigid metallic support structure, either before or after application of the film.

e) Woven and non-woven mesh sheets are very flexible and can readily be formed into desired shapes such as tubes or spirals prior to application of the sol. Plastically deformable supports can be profiled to create vortices in the fluid being filtered so as to avoid blockage, e.g. as described in U.S. Pat. No. 4075091.

f) Metal supports are electrically conductive, and microporous films can be made electrically conductive e.g. by using a doped titania sol or by incorporating in them a minor proportion of graphite or other powdered conductor.

The following examples illustrate the invention.

EXAMPLE 1

A) Materials Substances

Woven stainless steel meshes (industrial wirecloths) were obtained from Potter and Soar Limited in the form of rolled sheets approximately 1 m × 1 m square. Three mesh sizes were chosen, 500 meshes in $^{-1}$ (mesh opening 26 μm, thickness 70 μm), 300 meshes in $^{-1}$ (mesh opening 55 μm, thickness 70 μm), and 70 meshes in $^{-1}$ (mesh opening 200 μm, thickness 340 μm).

The substrates were prepared for coating by preheating in a solution of 7 parts sodium dichromate, 7 parts sulphuric acid and 400 parts water at 70° C. for 15 minutes. This is a standard pretreatment for adhesive bonding of stainless steels.

B) Sol composite and concentration.

Boehmite sols of concentration 30 gl$^{-1}$ were prepared as described. 500 ml aliquots of the sols were hydrothermally processed in a 2 liter capacity autoclave for 3 hours at 200° C. The 90 gl$^{-1}$ sols were prepared by thermal evaporation (at 80° C.) of the hydrothermally processed 30 gl$^{-1}$ sols.

C) Binder Composition

Polyvinyl alcohol (PVA) and methyl cellulose (Methocel) binders were obtained in the form of powders.

EXPERIMENTAL PROCEDURE i) Determination of optimum binder composition and concentration.

The binders were diluted with water and added to boehmite sols of concentration 30 gl$^{-1}$ or 90 gl$^{-1}$ alumina. The excess water introduced with the sols with the binders was removed by evaporation. The viscosity of the sol/binder mixtures was measured as a function of the binder concentration. Samples of 500 mesh and 70 mesh stainless steel wirecloth were dipped into the mixtures, withdrawn and examined using optical microscopy to assess the integrity of sol-gel films formed in the mesh openings. Optimum binder concentrations were determined from these observations.

ii) Assessment of coating variables.

Following determination of optimum binder composition and concentration, a matrix of dip coating experiments was conducted using the wirecloth substrates in order to develop a protocol for the preparation of sound sol-gel coatings. This included assessment of coatings formed by sols containing no binder.

Following coating, the sol-gel films formed within the metal substrates were examined in the gel state using optical and scanning electron microscopy (SEM). The composites were calcined using the following heating schedule: heating at 50° C./hour to 200° C., holding 1 hour, heating at 50° C./hour to 450° C., holding 1 hour, followed by a slow furnace cool to room temperature. The calcined samples were examined for coating integrity and thickness using optical microscopy and SEM, and recoated and calcined if cracks were observed. An additional variable was studied during this part of the programme. This involved preheating the stainless steel substrates by coating with a dilute (20 gl$^{-1}$) boehmite sol followed by calcination to 450° using the heat treatment described above. This pretreatment was included in order to assess the effect of depositing a thin layer of sol-gel ceramic on the surface of the steel prior to formation of a suspended sol-gel film within the structure, i.e. to facilitate good interfacial bonding at the points of suspension. The effects of sol-gel deposition rate was examined by slow draining of the sol from a vessel in which the substrate was immersed. The speed of the draining front was ~2 mm min$^{-1}$.

iii) Gas permeability measurements.

25 mm diameter discs were machined or punched from sheets of the metal substrates. Following coating and calcination the permability of the compositions to a series of gases was determined.

iv) Resistance to deformation.

Crack-free samples (or areas within samples) of coated and calcined 300 mesh composite were determined using SEM. The samples were subjected to controlled plastic deformation by bending and re-examined in the SEM for cracking in the vicinity of deformation.

RESULTS i) Determination of optimum composition and concentration.

A minimum binder addition of 10% to the 90 gl$^{-1}$ sol was required in order to yield an appreciable increase in viscosity. Addition of greater than 50 w/o binder resulted in gelation. Optimum binder additions were determined to be ~18 w/o for the 90 gl$^{-1}$ sol and ~40 w/o for the 30 gl$^{-1}$ sol. Both binders were selected for further study, as their effect on sol viscosity was similar.

ii) Assessment of coating variables.

Results of the experimental matrix, conducted using wirecloth substrates, are shown in Table 1. The coatings have been graded numerically, from 1 to 5, the highest value corresponding to the achievement of sol-gel films substantially free from cracks or pinholes. Some cracking was present in all of the films formed by initial coating. There appeared to be an optimum mesh size for coating, 300 meshes per inch, in which generally less cracking was observed. The 70 mesh wirecloths could only be coated using the higher concentration sols.

Coatings formed from sol/binder mixtures contained less cracks than coatings formed from sols alone. PVA and Methocel behaved similarly in this respect.

Most of the coatings could be improved by postcoating with a second coat of either sol alone, in the case of samples containing small cracks, or sol/binder where larger cracks were present. Occasional fine cracks, observed in otherwise good membranes are likely to have been caused by non-optimisation of the coating technique or by the presence of impurities, e.g. dust particles, in the sol. Crack-free coatings can be made by repeated dipping of the mesh into sols containing no thickening agent.

Slow dipping, by immersion of the substrate into a vessel containing 90 gl$^{-1}$ sol plus 20 gl$^{-1}$ Methocel followed by draining of the mixture from the vessel, produced excellent sol-gel films containing very few defects on the first coating. Coatings were less successful when applied using this method with the 30 gl$^{-1}$ boehmite/20 gl$^1$ Methocel sol/binder mixtures.

TABLE 1

| Sol Composition | Pre-Treatment | MESH 500 Coat No. 1 | 2 | 300 Coat No. 1 | 2 | 70 Coat No. 1 | 2 |
|---|---|---|---|---|---|---|---|
| 90 gpl Sol | — | 2 | 3 | 3 | 3 | 1 | 3 |
| 20 gpl Methocel | ✓ | 2 | 3 | 3 | 4 | 1 | 3 |
| 90 gpl Sol | — | 2 | 3 | 2 | 3 | 1 | 1 |
| 20 gpl .V.A. | ✓ | 2 | 4 | 2 | 4 | 1 | 1 |
| 30 gpl Sol | — | 2 | 3 | 2 | 3 | 1 | 2 |
| 20 gpl Methocel | ✓ | 2 | 5 | 3 | 4 | 1 | 2 |
| 30 gpl Sol | — | 2 | 3 | 2 | 4 | 0 | 1 |
| 20 gpl P.V.A. | ✓ | 2 | 3 | 1 | 5 | 1 | 1 |
| 90 gpl Sol | — | 1 | 1 | 1 | 2 | 0 | 1 |
|  | ✓ | 1 | 1 | 1 | 2 | 0 | 0 |
| 30 gpl Sol | — | 0 | 1 | 0 | 0 | 0 | 0 |
|  |  | 0 | 1 | 0 | 0 | 0 | 0 |

NUMERICAL GRADING
0: SOL-GEL FILM ON MESH SURFACE ALONE
1: MACROSCOPIC CRACKING OBSERVED
2: FINE CRACKS OBSERVED OPTICALLY
3: NO CRACKS OBSERVED OPTICALLY, CRACKS OBSERVED IN SEM
4: FEW CRACKS OBSERVED IN SEM
5: GENERALLY CRACK FREE IN SEM

EXAMPLE 2

A piece of 300 mesh stainless steel woven wire cloth was pretreated by immersion in a solution of 7 parts sodium dichromate, 7 parts sulphuric acid and 400 parts water at 71° C. for 15 minutes. The mesh was dip coated in an aqueous mixture of a hydrothermally processed 30 g/l boehmite sol and 20 g/l Methocel. A single dip was followed by calcination by heating in air using the following heating schedule: 50° C./hour to 200° C.; holding for 1 hour; 50° C./hour to 450° C.; holding for 1 hour; furnace cooling to room temperature. The coating and calcination procedure was then repeated using a 30 g/l boehmite sol.

A 25 mm diameter sample of each of the two materials was sealed into a holder with a Viton 'O'-ring. Thus the membrane separated two chambers, each of which had a single port. Helium gas was then fed into one chamber under pressure; it diffused through the ceramic membrane and passed out of the other chamber through a non-return valve. The helium gas-flow rate was controlled in the range 10 ml to 100 ml/min. normalized to standard temperature and pressure. This was done by using a commercially available mass flow controller. The pressure drop across the membrane needed to maintain the set flow rate was then measured with a differential pressure gauge. By plotting graphs of differential pressure against flow-rate for both samples and obtaining linear relationships passing through the origin over the complete range of flowrates, it was demonstrated that there was no significant leakage of Helium gas around the 'O'-ring seal. By performing replicate experiments and obtaining, within normal experimental variance, identical results, it was judged that the specimens had not suffered any cracking of the ceramic component during the first test. This was confirmed by light microscopical examination of the samples after they had been removed from the experimental cell. The temperature at which the experiment was carried out was 40° C. and the effective diameter for gas permeation was 22 mm.

The results of the test were 1462 ml/min/cm$^2$/Bar. Since the ceramic meniscus thicknesses were not constant the results are quoted in units of flux per unit pressure difference across each membrane.

EXAMPLE 3

A sample of 300 mesh stainless steel wirecloth was pretreated according to the procedure described in Example 2. The mesh was dip coated in a mixture of 30 gl$^{-1}$ boehmite sol, hydrothermally processed for 3 hours at 200° C., and 20 gl$^{-1}$ polyvinyl alcohol, and heat treated according to the schedule described in Example 2. Scanning electron microscopy of the coated and heat treated mesh revealed complete penetration of the mesh opening by a thin sol-gel membrane. The mesh was plastically deformed by bending the sample through 20° of permanent deformation around a cylindrical former of radius 3 mm. Scanning electron microscopy of the deformed area revealed no evidence of cracking in the suspended sol-gel flim. Very minor cracking had initiated at the sol-gel/metal interface of the inner strand of metal forming a woven mesh corner. This is very probably the point of maximum strain in the system during stressing.

EXAMPLE 4

Preparation of microporous zirconia membrane 3.5 g of Methocel binder was dissolved in 100 ml of distilled and deionised water. 30 g of sub-micron zirconia powder was added to the mixture to form a slurry, which was then ball-milled for 24 hours.

25 mm discs of woven 100 mesh hastelloy (a Ni, Cr, Fe, Si, Mn, Mo alloy, the mesh supplied by G. Bopp & Co., London N2) were coated with the slurry using a simple dipping or painting procedure, and fired to 800° C. in a mild reducing atmosphere. A second coat was applied in order to heal small cracks in the first coat, after which the firing schedule was repeated.

The composite membrane thus formed comprised menisci of zirconia suspended within the Hastelloy mesh interstices. These menisci had a minimum thickness of 15 to 20 microns. The membrane exhibited a pure water flux of 0.2 mn min$^-$cm$^{-2}$ at 10 psi and a gas burst pressure in excess of 10 bar. The membrane, could be cut into a desired shape after firing without incurring mechanical failure of the suspended ceramic films.

EXAMPLE 5

A Boehmite sol of concentration 30 gl$^{-1}$ was prepared by controlled hydrolysis of aluminium alkoxide. The dried and calcined (450° C.) gel formed from the sol was highly porous, with a mean pore size of about 10 nm.

One face of the porous membrane described in Example 4 was coated with the Boehmite sol by contacting the membrane with the surface of the sol, followed by drying in air and heat treating for 1 hour at 450° C. The composite membrane thus formed had a sol-gel coating approximately 2 microns thick, and exhibited a pure water flow rate of 0.01 ml/min/cm$^2$ at 16 psi.

EXAMPLE 6

6 g of methyl cellulose was dissolved in 75 ml of distilled and deionised water. 47.25 g of this mixture was combined with 52.75 g of water and 35 g of a zirconia powder of mean particle size less than two microns. The slurry thus formed was ball milled for 3 hours. Sheets of woven 100 mesh Iconel 600 (Nickel-chromium-Iron alloy, the mesh supplied by G. Bopp and Co.) were coated with the slurry using a simple painting procedure, such that the interstices of the mesh were filled with discrete menisci formed from the slurry. The coated sheet was heat treated at 950° C. for 1 hour which resulted in the formation of a microporous composite membrane comprising menisci of porous zirconia suspended within the metal mesh interstices. The menisci had a typical thickness of between 40 and 80 microns and exhibited a pure water flux, in dead end filtration mode, of between 8 and 10 ml min$^{-1}$ cm$^{-2}$ at 10 psi.

EXAMPLE 7

A slurry was prepared according to the recipe described in Example 6, except that 10 weight percent of the zirconia was replaced by another zirconia powder of mean particle size less than 0.2 microns, thus giving rise to a bimodal particle size distribution. The slurry was ball milled for 4 hours and subsequently brush coated on a sheet of woven mesh Inconel 600. The coated sheet was heat treated at 950° C. for 1 hours and the resulting microporous membrane exhibited a pure water flux at 10 psi of ~1-2 ml min$^{-1}$ cm$^{-2}$ at 10 psi, and retained >99% when challenged with an aqueous dispersion of 0.22 micron diameter latex beads. The air burst pressure of the membrane exceeded 8 bar.

EXAMPLE 8

A slurry was prepared according to the method described in Example 6, excepting that the zirconia powder was of slightly larger mean diameter (2.5 microns) and the composition included the addition of 1.75 g of yttria powder. The slurry was ball milled for 3 hours and coated onto sheets of 100 mesh Inconel. The composite was heat treated at 1100° C. for 1 hour and the microporous membrane thus formed exhibited a pure water flux at 10 psi of ~15 ml min$^{-1}$ cm$^{-2}$ and an air burst pressure in excess of 20 bar.

EXAMPLE 9

A composite microporous membrane prepared according to the method described in Example 7 was pretreated by dipping for 30 seconds in a 5 wt % sodium silicon solution and air dried. A boehmite sol of concentration 30 gl$^{-1}$ was prepared by controlled hydrolysis of aluminium alkoxide was hydrothermally treated for 5 hours at 250° C. The composite microporous membrane was coated on one face with the boehmite sol by contacting the surface of the membrane with the liquid sol. Ater heat treating at 450° C. for 1 hour the composite ultrafiltration membrane then formed exhibited a thin discreet sol-gel coating with a pore size of 15 nm with no evidence of craters or pinholes.

We claim:

1. A composite membrane comprising an inorganic support composed of woven or non-woven fibers and having interstices of diameter greater than 5 microns and length less than ten times their diameters, and porous inorganic films of sintered non-metallic particles carried by the support and bridging the interstices thereof, the films having pore sizes up to 2 microns and being substantially coplanar with the support, wherein each film is meniscus shaped having a minimum thickness in the middle of the interstice, which thickness is about the same as or less than the thickness of the support.

2. A membrane as claimed in claim 1 which is plastically deformable without substantially altering the porosity of the films.

3. A membrane as claimed in claim 1, wherein the support is a woven non-metal mesh.

4. A composite membrane comprising an inorganic support composed of fibers and having interstices of diameter greater than 5 microns and length less than ten times their diameters, and porous inorganic films of sintered non-metallic particles carried by the support and bridging the interstices thereof, the films having pore sizes up to 2 microns and being substantially coplanar with the support, wherein the support is a woven metal mesh, wherein each film is meniscus shaped having a minimum thickness in the middle of the interstice, which thickness is about the same as or less than the thickness of the support.

5. A membrane as claimed in claim 1, wherein the support is composed of fibres and the non-metallic particles of the films have an average diameter not more than 20% of the average diameter of the fibres.

6. A membrane as claimed in claim 1, wherein the films carry on at least one surface a microporous inorganic coating formed by a sol-gel technique.

7. A membrane as claimed in claim 1, wherein the films carry on at least one surface a microporous inorganic coating formed by a non-sol-gel technique.

8. A method of making a composite membrane by the use of an inorganic support composed of woven or non-woven fibers and having interstices of diameter greater than 5 microns and length less than ten times their diameters, which method comprises applying to the support a suspension of sinterable inorganic non-metallic particles, so as to create films bridging the interstices thereof, and drying and heating the films to partly sinter the particles and form films having pore sizes up to 2 microns, said films being substantially coplanar with the support, wherein each film is meniscus shaped having a minimum thickness in the middle of the interstice, which thickness is about the same as or less than the thickness of the support.

9. A method as claimed in claim 8, wherein the suspension of particles is in a solution of an organic polymer, and the heating is performed so as to remove the polymer from the membrane.

10. A method as claimed in claim 8, wherein the suspension comprises from 60–95% by weight of larger particles of average size from 0.5–50 microns and correspondingly from 40–5% by weight of smaller particles of average size from 4 nm to 1 micron but not more than 0.1 times the average size of the larger particles.

* * * * *